(12) United States Patent
Batista et al.

(10) Patent No.: US 12,445,390 B2
(45) Date of Patent: Oct. 14, 2025

(54) ALLOCATING NETWORK RESOURCES TO MEDIA FLOWS

(71) Applicant: Telefonaktiebolaget LM Ericsson (publ), Stockholm (SE)

(72) Inventors: Pedro Batista, Sollentuna (SE); Mateus Santos, Sao Paulo (BR); Aldebaro Klautau, Belém PA (BR); Peter Öhlén, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 22 days.

(21) Appl. No.: 17/800,794

(22) PCT Filed: Feb. 20, 2020

(86) PCT No.: PCT/EP2020/054458
§ 371 (c)(1),
(2) Date: Aug. 18, 2022

(87) PCT Pub. No.: WO2021/164873
PCT Pub. Date: Aug. 26, 2021

(65) Prior Publication Data
US 2023/0035177 A1    Feb. 2, 2023

(51) Int. Cl.
*H04L 47/80*       (2022.01)
*H04L 47/70*       (2022.01)

(52) U.S. Cl.
CPC .......... *H04L 47/801* (2013.01); *H04L 47/805* (2013.01); *H04L 47/822* (2013.01)

(58) Field of Classification Search
CPC ... H04L 47/801; H04L 47/805; H04L 47/822; H04L 65/1095; H04L 65/612; H04L 65/765; H04L 41/16; H04L 41/5067; H04L 43/026; H04L 65/80
See application file for complete search history.

(56) References Cited

U.S. PATENT DOCUMENTS

| | | | |
|---|---|---|---|
| 9,894,010 B2 | 2/2018 | Ramakrishnan et al. | |
| 2003/0172163 A1* | 9/2003 | Fujita | H04L 67/1001 709/226 |
| 2007/0088845 A1 | 4/2007 | Memon et al. | |
| 2009/0180430 A1* | 7/2009 | Fadell | H04L 47/824 370/329 |

(Continued)

OTHER PUBLICATIONS

International Search Report and Written Opinion of the International Searching Authority for PCT International Application No. PCT/EP2020/054458 dated Aug. 19, 2020.

(Continued)

*Primary Examiner* — Farzana B Huq
(74) *Attorney, Agent, or Firm* — Sage Patent Group

(57) ABSTRACT

Methods, apparatuses and computer programs are disclosed. The method of allocating network resources to a plurality of media flows in a communications network, the method comprising the steps of: determining a media content characteristic for the plurality of media flows; partitioning the plurality of media flows into one or more media flow groups based on the media content characteristic; initiating allocation of a separate network resource pool to the one or more media flow groups to be used by media flows belonging to respective media flow group.

20 Claims, 11 Drawing Sheets

(56) References Cited

U.S. PATENT DOCUMENTS

| | | | |
|---|---|---|---|
| 2009/0296578 A1 | 12/2009 | Bernard et al. | |
| 2015/0172213 A1* | 6/2015 | Ludwig | H04L 41/0896 709/226 |
| 2016/0028595 A1* | 1/2016 | Ramakrishnan | H04L 65/60 709/226 |
| 2018/0131632 A1* | 5/2018 | Ramakrishnan | H04L 65/80 |
| 2019/0069039 A1* | 2/2019 | Phillips | H04N 21/64738 |
| 2019/0124555 A1 | 4/2019 | Szilagyi et al. | |
| 2019/0149858 A1* | 5/2019 | Oh | H04N 21/2387 725/116 |

OTHER PUBLICATIONS

Vasilev et al., "Predicting QoE Factors with Machine Learning," 2018 IEEE International Conference on Communications (ICC), 2018, pp. 1-6.

* cited by examiner

ALLOCATING NETWORK RESOURCES TO MEDIA FLOWS

CROSS REFERENCE TO RELATED APPLICATION

This application is a 35 U.S.C. § 371 national stage application of PCT International Application No. PCT/EP2020/054458 filed on Feb. 20, 2020, the disclosure and content of which is incorporated by reference herein in its entirety.

TECHNICAL FIELD

The disclosure relates to methods, apparatuses and computer programs. More particularly, the disclosure relates to allocating network resources to media flows.

BACKGROUND

One type of content transmitted via communication networks is multimedia content, such as digital audio and video. The media content may be delivered to end users in several ways, one of which is streaming. Media streaming involves continuously receiving and presenting media to an end-user while being delivered by a media provider. The end-user can use their media player to play digital video or digital audio content before the entire file has been transmitted from the media provider.

There are challenges with streaming content via communication networks, such as the Internet, which is often due to the communication networks being heterogenous. The available bandwidth between network links may fluctuate. For example, end users whose network connection lacks enough bandwidth may experience stops, stalling, lags, or slow buffering when trying to play the streamed media content, which altogether degrade quality of experience (QoE).

To address the above challenges, adaptive bitrate streaming (ABR) technique may be used. The delivery of media content with ABR is realised by encoding the media in different quality levels. The higher the quality level, the more network bandwidth is needed to deliver the media content. ABR estimates and selects the maximum media quality that can be downloaded using the available network bandwidth. In case of limited network bandwidth, presenting the media to the end user in lower quality using ABR causes smaller degradation of QoE compared to QoE degradation as a result of stalling, stopping or buffering which are likely in a case when ABR is not used.

The estimation of available bandwidth and selection of media quality in the ABR are typically performed at the application layer, without intervention or knowledge from the network provider. In case of network congestion, to promote fairness, network transport algorithms, executed below the application layer, attempt to divide the available network bandwidth equally among the competing network clients. Such uniform division of bandwidth forced by the underlying network leads the ABR to adapt the media quality equally in terms of bitrate, but the QoE of different end users is not the same at the same bitrate.

The QoE usually depends on the media content. FIG. 1 shows an example of the estimated QoE which, in this case, is mean opinion score (MOS) as a function of the video bitrate. This QoE curve (QC) indicates the QoE that the end user will experience as a function of the video bitrate which corresponds to required network bandwidth. The curve of FIG. 1 shows that at 1 Mbps, the QoE of one video can be 10% lower than the QoE of the other. Thus, equal division of bandwidth would not lead to fairness in terms of QoE.

Typically, there is no communication between network provider managing the network infrastructure over which media content is transmitted, and over-the-top (OTT) provider which provides media content and implements ABR. Moreover, OTT provider often encrypts the media connection, so the network provider is not aware of the type of payload flowing in the network. The network provider, utilizing appropriate transport algorithms, usually divides the network bandwidth equally, leading to unfair sharing in terms of QoE.

It has been proposed to tackle this problem by identifying individual quality level that might be maintained for each client. In this scenario, the network provider enforces, for each client, a quality of service (QoS) that is to be maintained. This strategy implies an increased overhead of maintaining a QoS for each individual network flow and requires communication of the network provider with the OTT provider.

It has been also proposed to modify the ABR algorithm. In this scenario, the QoE experienced by all the end users who are competing for bandwidth might be shared information. Then, each end-user can consider the others and derive a fair quality of the network resource. This approach requires modification of the ABR algorithm on the OTT provider side.

SUMMARY

The object of the present invention is therefore to find a solution to problems resulting from unfair sharing of network resources in terms of QoE experienced by end-users of media content transmitted over the network.

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

One aspect of the present disclosure provides a method of allocating network resources to a plurality of media flows in a communications network. The method comprises the steps of: determining a media content characteristic for the plurality of media flows. The method further comprises partitioning the plurality of media flows into one or more media flow groups based on the media content characteristic. Further, the method comprises initiating allocation of a separate network resource pool to the one or more media flow groups to be used by media flows belonging to respective media flow group.

Another aspect provides an apparatus for allocating network resources to a plurality of media flows in a communications network. The apparatus comprises processing circuitry and a memory containing instructions executable by the processing circuitry, whereby the apparatus is operable to determine a media content characteristic for the plurality of media flows. The apparatus is further operable to partition the plurality of media flows into one or more media flow groups based on the media content characteristic. The apparatus is further operable to initiate allocation of a separate network resource pool to the one or more media flow groups to be used by media flows belonging to respective media flow group.

At least some embodiments of the disclosure advantageously allow that no end-user consuming media content is experiencing a better QoE at the cost of another end-user experiencing lower QoE.

At least some embodiments of the disclosure allow the network operator or provider to dispense with the requirement to maintain individual QoS for each media flow, which would involve additional network overhead. Moreover, end-users may continue experiencing the benefits of ABR, as no client-side modifications are required, which may be the case when individual QoS are enforced at the network level. At least some embodiments of the disclosure do not require modifications of the client-side ABR algorithm.

Additionally, at least some embodiments of the disclosure advantageously enable network provider to ensure that end-users experience a similar QoE. The SLA usually define a minimal level of QoE experienced by end-user. The embodiments of the disclosure enable the improvement of the end-users experiencing the worst QoE, which could lead to violation of the SLA. This improvement is achieved while maintaining the network infrastructure, for example link capacity, which would need to be increased otherwise. The network provider or operator may therefore deliver a minimal service level agreement (SLA) to all concerned users of the network.

The embodiments of the disclosure advantageously ensure that, in the presence of multiple options for network resources, the media flows are grouped using QoE (QC) similarity. Similar QC ABR media flows compete for resources, leading to fair sharing of the network infrastructure. The embodiments of the disclosure also allow a better aggregate QoE while maintaining the unmodified client ABR functionality and associated benefits.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general-purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor, DSP hardware, a reduced instruction set processor, hardware (e.g., digital or analogue) circuitry including but not limited to application specific integrated circuit(s), ASIC and/or field programmable gate array(s), FPGA(s), and (where appropriate) state machines capable of performing such functions.

Figure 1:
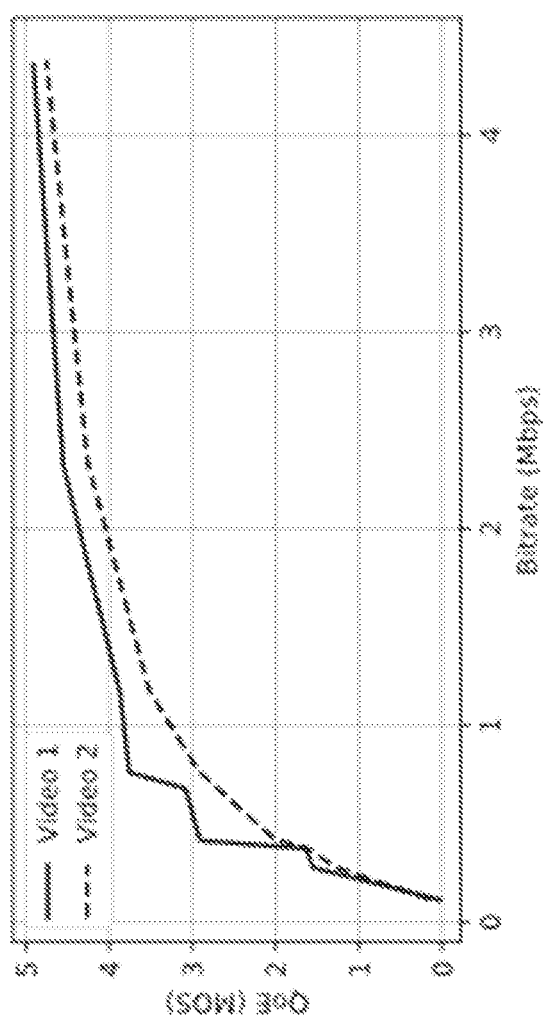
FIG. 1 is a diagram illustrating an example QoE as a function of bitrate for two different videos.

FIG. 1 illustrates an example chart of the estimated QoE which, in this case, is mean opinion score (MOS) as a function of the video bitrate. The QoE curve is a characteristic of the media encoding process, such as video encoding. In general, in case of video, low-dynamic video scenes or segments can be compressed more, which, at the same bitrate, provides better QoE than a high-dynamic video scenes or segments. These differences are partially due to the videos being encoded using variable bitrate (VBR) encoding. VBR allows a higher bitrate, and therefore more storage space or network bandwidth, to be allocated to the more complex segments of media files, while less resources are allocated to less complex segments.

For example, many videos shared on YouTube comprise a person filming himself/herself while talking close to a camera ("Video 1" of FIG. 1). Such videos exhibit low visual dynamic and to deliver a QoE (MOS) of 4, they require bitrate of about 1.5 Mbps. Another class of media content are films distributed by film streaming platforms such as Netflix, which may correspond to "Video 2" on FIG. 1. These videos are typically composed of scenes with a high number of varying visual segments, in which many presented visual elements are in motion, for example. These videos, to deliver a QoE (MOS) of 4, need 2 Mbps. The curve of FIG. 1 shows that at 1 Mbps of bitrate, the QoE of "Video 1" can be approximately 10% higher than the QoE of "Video 2". Thus, if two clients, one watching a person talking to a camera on YouTube, and the other one a music video clip or action film, are facing network congestion in a 2 Mbps link, the network provider should not allocate 1 Mbps to each client which would lead to a 10% difference in QoE, but instead, should allocate more bandwidth to the user watching music video clip or film, so that both clients experience the same QoE.

In another scenario, if the competing users have similar QoE curve, the best sharing of network resources, for example network bandwidth, in terms of QoE, is the same as the typical equal bandwidth sharing, where, for many users watching films, the equal share of bandwidth produces equal QoE. Thus, in case of multiple bottlenecks in the network, the type of content consumed by users competing for network resources has high impact on QoE.

Figure 2:
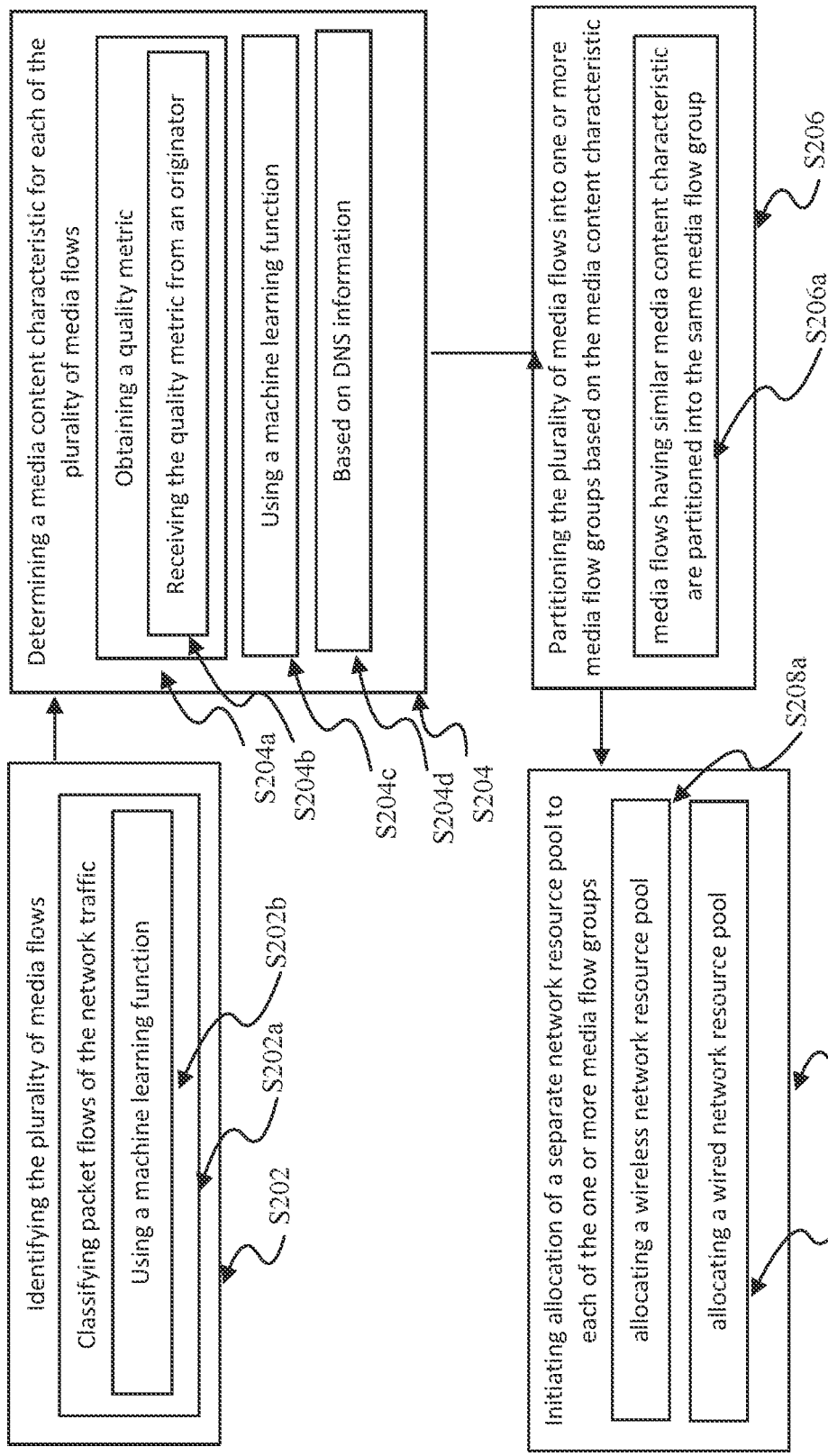
FIG. 2 is a flow chart of an example of a method according to an embodiment.

FIG. 2 illustrates a flow chart of an example of a method 200 of allocating network resources to a plurality of media flows in a communications network. Depending on the network type, for example wireless or wired network, the network resources may include configurable and allocable functions, elements and parameters of the network essential for delivery of network services. Media flows may include media streaming flows, such as compressed or uncompressed digital video or digital audio content. Media flows may preferably comprise ABR flows. The method 200 may comprise, at step S202, identifying the plurality of media flows from network traffic in the communications network. Media flows in the network may be communicated as payload of packets in a packet-based network, for example. Each packet flow may comprise a plurality of packets, each of which, in addition to the payload, may also carry or include static or dynamic network traffic parameters. In particular, a packet may comprise a header including, for example, packet metadata and addressing information. The network provider may analyse the Internet Protocol (IP) headers of packets on one or more network nodes on a network path of interest. The network node may contain a deep packet inspection (DPI) module for example to access packet metadata. In other networks, for example in Third Generation Partnership Project (3GPP) Fourth Generation (4G) mobile networks, the network nodes where media flows may be identifies may include Packet Data Network Gateway (PDN-GW). In 3GPP Fifth Generation (5G) mobile networks, the identification of media flows may be performed at least partially in User Plane Function (UPF). Different types of packet flows, for example carrying different types of content, may be characterised by different patterns associated with respective packet flow. In some examples, network provider may observe and calculate time difference between subsequent packets transmitted as part of a particular packet flow between a source and destination in the network. Based on these calculations, a pattern may be identified which is characteristic to this particular class of packet flow. Therefore, packet flows, such as media flows, may be identified by classifying, at step S202a, packet flows of the network traffic based on network traffic parameters for packets belonging to respective packet flow.

The packet flows of the network traffic may also be classified, at step S202b, based on network traffic parameters for packets belonging to respective packet flow using a second machine learning function. In particular, the second machine learning function may use statistical or time series features of packet flow to create a classification model and may handle both encrypted and unencrypted traffic. The second machine learning function may comprise machine learning techniques such as random forest (RF) or k-nearest neighbour (KNN). The second machine learning function may also comprise deep learning techniques. Deep learning may automatically select features of the packet flow through training, and the models may be created with deep learning techniques including Multi-Layer Perceptron (MLP), auto-encoder or convolutional neural networks (CNN), for example.

The method 200 may further comprise, at step S204, determining a media content characteristic for the plurality of media flows. In some examples, the method may comprise determining a media content characteristic for each of the plurality of media flows In this step, the media content characteristic may be estimated using a number of techniques, such as by utilising machine learning, or may be informed by another entity. In particular, determining the media content characteristic may comprise, at step S204a, obtaining a quality metric for the plurality of media flows, the quality metric being indicative of user-perceived media quality in relation to media flow bitrate. In some examples, determining may comprise obtaining S204a a quality metric for each of the plurality of media flows. In some examples, obtaining the quality metric may comprise receiving, at step S204b, the quality metric from an originator of the respective media flow. The originator of the media flow may comprise the OTT provider, such as a streaming platform configured to provide multimedia streaming content to users. In some examples, the originator may comprise a separate service hosted remotely. In other examples, the originator of the media flow may comprise a host client device. In some examples, receiving S204b may comprise receiving media content characteristic data sent from the OTT provider via the network. In other examples, media content characteristic may be received from the host client device.

In one example of Server And Network-assisted Dynamic Adaptive Streaming over HTTP (SAND), the media content characteristic may be comprised in media presentation description (MPD) which may be accessible by the network operator. In particular, the MPD may be transmitted from the OTT provider to the DASH-aware network element (DANE). The MPD may contain the desired QoE information, such as QC curve. The QC curve data may be used to define the average QoE per throughput (QT) for each media flow.

In some examples, the media content characteristic may be determined, at step S204c using a first machine learning function based on network traffic parameters for respective media flow. In some examples, a machine learning model can be trained to classify network traffic as either high or low dynamic. The model may be trained with a first machine learning algorithm, such as naïve Bayes or random forest, using input dataset constructed from data comprising network performance counters or parameters relating to the media flow, such as packet headers, packet sizes, queue sizes, for example.

In some examples, the media content characteristic may be determined, at step S204d, based on domain name system, DNS information associated with the respective media flow. For example, the domain name system may be used to translate between the numerical destination or source Internet Protocol (IP) address contained in packet headers, and textual domain names. The domain name system may be used to identify that packets belonging to a particular media flow are exchanged between end-user and a known streaming provider, such as espn.com, for example. On this basis, such media flow may likely carry streaming media content related to sport event, and therefore the media flow may be labelled as high-dynamic video flow, for example.

The method 200 may further comprise partitioning, at step S206, the plurality of media flows into one or more media flow groups based on the media content characteristic. In some examples, the plurality of media flows may be partitioned, at step S206a, into one or more media flow groups such that media flows having similar media content characteristic are partitioned into the same media flow group. In the example of SAND, based on the QT data obtained from the MPD, the media flows may be sorted by QT in an ascending order. The first half of the sorted QT may then be selected, and media flows associated with the first half of sorted QT may be grouped together and labelled as low-dynamic. Correspondingly, the media flows associated with the second half of sorted QT may be grouped together and labelled as high-dynamic.

The method 200 may further comprise, at step S208, initiating allocation of a separate network resource pool to the one or more media flow groups to be used by media flows belonging to respective media flow group. In some examples, allocation of a separate network resource pool is initiated to each of the one or more media flow groups. In a communications network, a user can be served by different network resources, which may depend on whether the communications network is wired or wireless, for example. In case of wireless communications network, initiating allocation of a separate network resource pool may comprise, at step S208a, allocating a wireless network resource pool to the one or more media flow groups, and in some examples, to each of the one or more media flow groups. In the wireless communication networks, such as mobile or cellular networks, wireless devices 330a such as user equipment 330a of end users, when being served by the same base station 350b, may be competing for available radio frequency bands. In a densely populated areas, two base stations 350a, 350b may be provided to allow connectivity to the users 330a, 330b. In case of wired networks, initiating allocation of a separate network resource pool may comprise, at step S208b, allocating a wired network resource pool to the one or more media flow groups, and in some examples, to each of the one or more media flow groups. The wired network may include optical network 360c, in which, for example in a fiber-to-the-home (FTTH) deployment scenario, there may be multiple paths connecting the users. In another example of content delivery networks (CDN), there may be multiple sources of content available for users.

Figure 3:
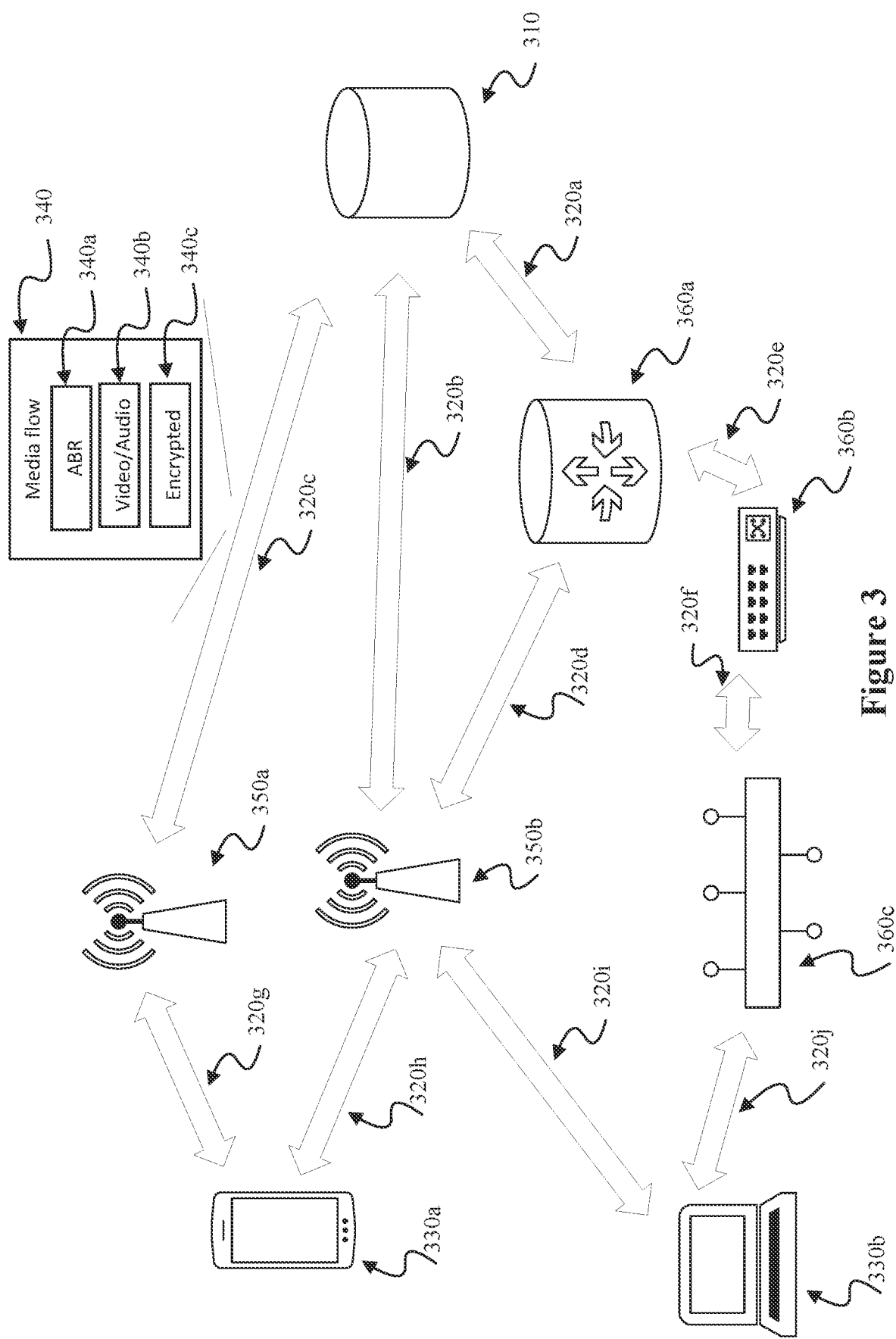
FIG. 3 is a schematic of an example communication network implementing some of the steps of the method according to an embodiment.

FIG. 3 illustrates a schematic of an example communication network 300. The network 300 may comprise a media originator 310, such as OTT provider node 310 which is configured to provide media flows 340 to ends users 330a-b. The network 300 may further comprise communication links 320a-j which correspond to communication paths connecting network entities, which may be used by media flows 340 when being transmitted via the network 300. Media flows 340, such as media streaming, may originate at the OTT provider 310 and may then be transmitted via the network 300 using different network resources, to be delivered to a destination, such as end user having end device, for example user equipment 330a or personal computer 330b. The example of FIG. 3 illustrates different network routes as different resources, however other types of network resources are also possible. Media flows 340 carried in the network 300 may comprise audio/video media flows 340b. Media flows 340 may also be streamed using ABR, thereby creating ABR flows 340a. Media flows 340 may also be secured against unauthorized access, thereby creating encrypted media flows 340c.

The network provider or operator may identify, configure and expose the available network resource pools to provide multiple options for network resources to be used by the media flows. In some examples, there may be two communication paths leading to the same destination in the network. For example, the user equipment 330a may communicate using a link 320g connecting to the first base station 350a or may use a link 320h connecting to the second base station 350b. In another example, personal computer 330b may connect wirelessly to the base station 350b, or may connect via the optical connection 320j, 360c. In other examples, the network operator may use policy-based routing to create an artificial pool of network resources by configuring two QoS forwarding queues, for example. Schedulers or switches 360b in the network may for example be reconfigured to create artificial queues, wherein each queue corresponds to a separately allocable network resource pool.

When separate network resource pools are configured by the network operator, media flows 340 belonging to one media flow group, for example grouping low dynamic videos, may be allocated a first network resource pool, for example a first communication path 320c, 320g to the end user 330a. Correspondingly, media flows 340 belonging to another media flow group, for example grouping high dynamic videos, may be allocated a second network resource pool, for example a second communication path 320b, 320i to the end user 330b. Network resources in the allocated network resource pool may be divided substantially equally among media flows belonging to respective media flow group when cumulative demand for network resources by the media flows in the respective media flow group exceeds the supply of the network resources in the allocated network resource pool, which may correspond to a case of network congestion, for example. In this way, media flows, such as ABR video flows, grouped together according to similarity in terms of QC, may compete for network resources from the same network resource pool, leading to fair sharing of the infrastructure or resources in the network 300.

Figure 4:
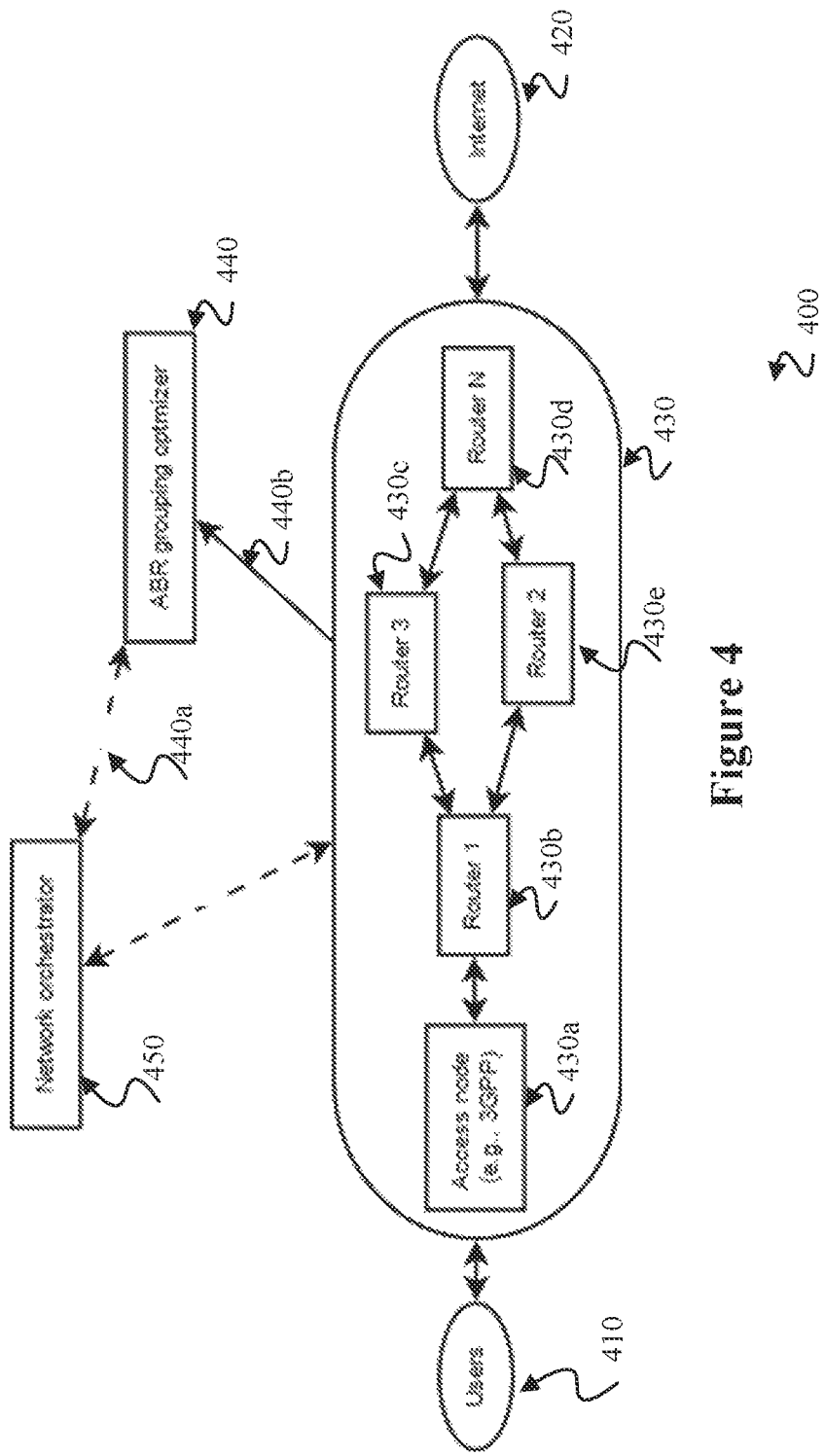
FIG. 4 is a block diagram illustrating some of the steps of the method according to an embodiment.

FIG. 4 is a block diagram illustrating a communications network 400 implementing at least some of the steps of the method 200. The network 400 may comprise end user 410 or users 410 which may have client devices 410 adapted to receive media flows from the network 400. The communication network 400 may also include a connection link to other networks, represented as "Internet" 420. For the purposes of illustration, the network 400 may include a subnetwork 430 which may comprise several configurable network entities 430a-e, in particular radio network access node 430a, such as evolved-NodeB (eNb), 5$^{th}$ Generation NodeB (gNB) or Wi-Fi access point, for example. The subnetwork 430 may further include network traffic forwarding nodes 430b-e, such as routers 430b-e. The network nodes 430a-e may be interconnected for communicating network traffic, such as media flows. The network 400 may further comprise an apparatus implementing the method according to the embodiments of the disclosure, such as ABR grouping optimizer (AGO) 440. The optimizer node 440 may have a communication interface 440a to a network orchestrator node 450. The grouping optimizer node 440 may request the orchestrator node 450 to allocate media flows to different network resource pools. The grouping optimizer node 440 may also have a communication interface 440b with the subnetwork 430 allowing collection of data from the media flows and identification of media flows. In some examples, allocation of network resource pools may comprise reconfiguring routers 430b-e and/or radio access nodes 430a.

Figure 5:
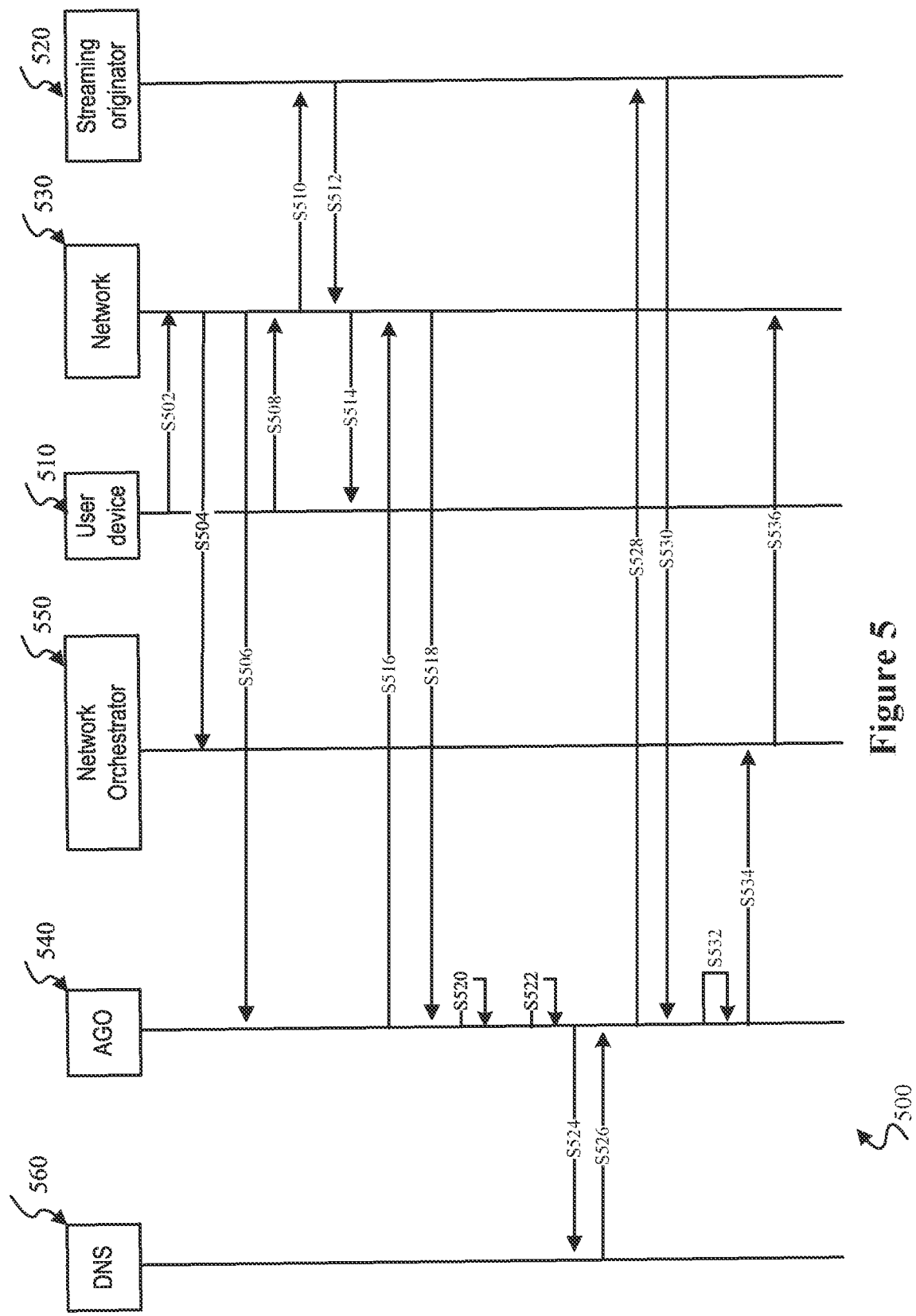
FIG. 5 is a message sequence chart illustrating some steps of the method according to an embodiment.

FIG. 5 is a message sequence chart illustrating some steps of the method 500 according to an embodiment. At step S502, a user device 510 connect with a network 530. The user device 510 may connect with the network for the first time, or may reconnect following certain event, such as handover or loss of signal in a radio network. At step S504, the operator of the network 530 may configure network resources via the network orchestrator 550. Once the network resources are configured, the operator of the network 530 may inform, at step S506, the AGO 540 of the available network resources to be allocated or reconfigured, such as queues in schedulers or routers. At step S508, the user device 510 may send a media streaming request to the network 530, which then, at step S510, forwards the media streaming request to the streaming originator 520. The streaming originator may respond, at step S512, by transmitting a media stream via the network 530 and subsequently, at step S514 to the user device 510.

The AGO 540 may then request the network 530, at step S516, to provide data indicative of network traffic flows transmitted via the network 530. The request may be sent as a result of a change in the network 530, such as configuration or removal of a network link, appearance of a new user of the network 530 or user leaving the network 530. The request may also be issued periodically or may be sent ad-hoc, for example following receipt of an instruction from Operations Support System (OSS, not shown). The network 530 may respond to the request S516, by providing network traffic data, at step S518, on the network traffic flows in the network 530. The network traffic may include a plurality of traffic flows, each related to a different type of service or content. Each type or class of network traffic flow may comprise different characteristics, for example header information, payload size, time between subsequent packets or security configuration.

Each traffic flow may also be treated differently by the network 530, for example the network 530 may be configured to give priority to certain packet flows. This network configuration may be a result of a policy maintained in the network 530, such as Service Level Agreement. The SLA may impose on the network 530 that certain network traffic flows receive a particular treatment from the network 530. This may be represented by configuring the network resources with so that network parameters or service parameters defined in the SLA are maintained. The network traffic data may include network parameters such as packet header information, packet timestamps, inter-packet time difference for example. On the basis of the received network traffic data, the AGO 540 may then perform, at step S520 identification of a plurality of media flows by, for example, classifying the network flows based on network traffic parameters from the obtained network traffic data. Once the media flows are identified, the AGO 540 may then determine, at step S522, a media content characteristic for the plurality of media flows, in some examples to each of the plurality of media flows, by classifying the media flows into a category of media content, for example high dynamic or low dynamic video content, using the trained machine learning model. Alternatively, or in addition, the AGO 540 may, at step S524, communicate with the DNS system 560 to determine the media content characteristic based on DNS information associated with the respective media flow and fed back, at step S526, to the AGO 540. Alternatively, or in addition, the AGO 540 may obtain a quality metric for the plurality of media flows, in some examples for each of the plurality of media flows, the quality metric being indicative of user-perceived media quality in relation to media flow bitrate, for example by requesting, at step S528, QC data related to the media flow from an originator 520 of the respective media flow, which can then be sent back, at step S530, to the AGO 540.

Having the information of the media flows in the network 530 and associated media content characteristics, the AGO 540 may group, at step S532, the media flows according to the media content characteristic. In particular, media flows being determined as relating to high dynamic video content are grouped together in one media flow group. Media flows being determined as relating to low dynamic video content are grouped together in another media flow group.

With the grouped media flows, the AGO 540 may request, at step S534, the network orchestrator node 550 to allocate different network resource pools to each media flow group. The network orchestrator 550 then communicates, at step S536, with the network 530 to configure network resources in line with the request of the AGO 540.

Figure 6:
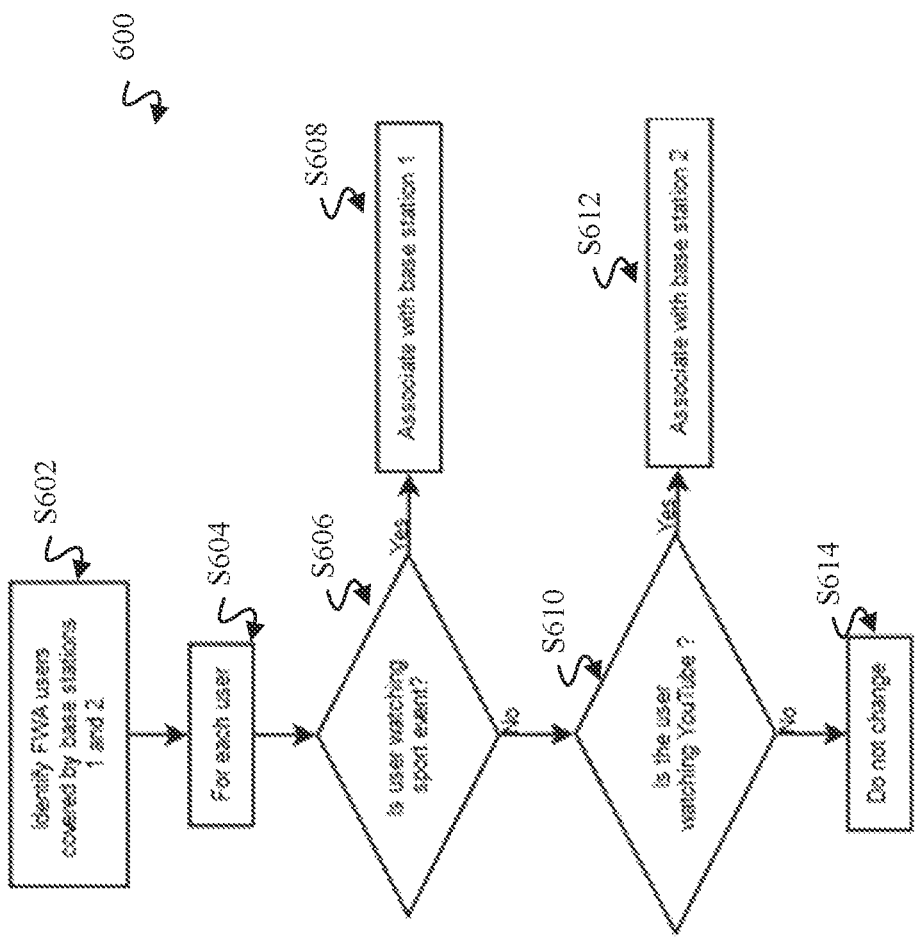
FIG. 6 is a flow chart illustrating some steps of the method according to an embodiment.

FIG. 6 illustrates some steps of the method 600 according to another embodiment. In the illustrated scenario, the method 600 may be used to assist network planning stage. For example, at step S602, multiple users may be identified who may be within radio coverage of two radio base stations as part of fixed wireless access (FWA). Then, repeating S604 for each user, a determination is made, at step S606, whether media content consumed by the user via the network is high dynamic video content, for example. The high dynamic video content may comprise sport event streaming. At step S608, if it is determined that the user watches high dynamic video content, then the media flow associated with this user is reconfigured such that it is served by base station 1. In case it is determined that the user does not watch high dynamic video content, then, at step S610, it is determined if the user is consuming low dynamic video content, such as a YouTube video with a person talking close to the camera. If the user is watching low dynamic video content, then the media flow associated with this user is reconfigured, at step S612, in the network, so as to be served by base station 2. In case the user profile does not satisfy any of the above conditions, then no network reconfiguration is made S614. It can be therefore predicted which houses typically watch sports events on weekends and place them in a separate network resource pool, than other houses which typically watch low dynamic films. Thus, client devices streaming sports events can share network bandwidth equally and experience similar QoE. Similarly, client devices streaming low dynamic films or video can share network bandwidth equally among themselves and thus experience similar QoE.

Figure 7:
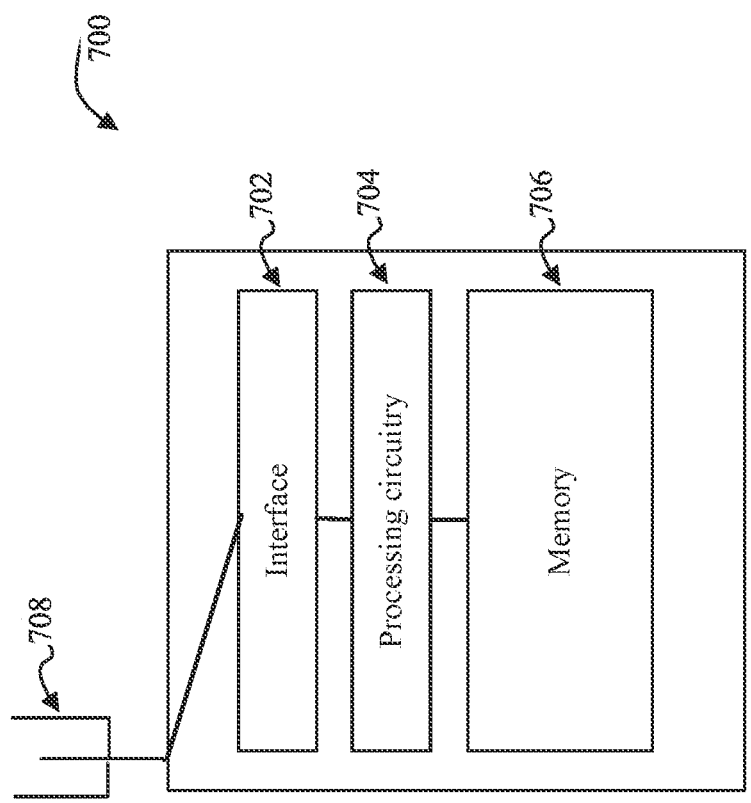
FIG. 7 is a schematic of an example of an apparatus according to an embodiment.

FIG. 7 illustrates an apparatus 700. The apparatus 700 may enable allocating network resources to a plurality of media flows in a communications network. The apparatus 700 may comprise a network device or network node (ND) 700. The apparatus 700 may comprise AGO 440, 540. The network node 700 may, in some embodiments, be an electronic device that can be communicatively connected to other electronic devices on the network (e.g., other network devices, user equipment devices (UEs), radio base stations, etc.). In certain embodiments, network device 700 may include radio access features that provide wireless radio network access to other electronic devices (for example a "radio access network device" may refer to such a network device) such as user equipment devices (UEs). For example, network device 700 may be a base station, such as eNodeB in Long Term Evolution (LTE), NodeB in Wideband Code Division Multiple Access (WCDMA) or other types of base stations, as well as a Radio Network Controller (RNC), a Base Station Controller (BSC), or other types of control nodes. As depicted in FIG. 7, the example apparatus 700 such as a network device 700 may comprise processor or processing circuitry 704, memory 706, interface 702, and antenna 708. These components may work together to provide various network device functionality as disclosed herein. In some examples, the memory 706 contains instructions executable by the processing circuitry 704, whereby the apparatus 700 is operable to determine a media content characteristic for each of the plurality of media flows. The apparatus 700 may be further operable to partition the plurality of media flows into one or more media flow groups based on the media content characteristic. The apparatus 700 may be further operable to initiate allocation of a separate network resource pool to each of the one or more media flow groups to be used by media flows belonging to respective media flow group.

Processor 704 may be a microprocessor, controller, microcontroller, central processing unit, digital signal processor, application specific integrated circuit, field programmable gate array, any other type of electronic circuitry, or any combination of one or more of the preceding. The processor 704 may comprise one or more processor cores. In particular embodiments, some or all of the functionality described herein as being provided by network device 700 may be implemented by processor 704 executing software instructions, either alone or in conjunction with other network device 700 components, such as memory 706.

Memory 706 may store code (which is composed of software instructions and which is sometimes referred to as computer program code or a computer program) and/or data using non-transitory machine-readable (e.g., computer-readable) media, such as machine-readable storage media (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, memory 706 may comprise non-volatile memory containing code to be executed by processor 704. Where memory 706 is non-volatile, the code and/or data stored therein can persist even when the network device is turned off (when power is removed). In some instances, while network device 700 is turned on that part of the code that is to be executed by the processor(s) 704 may be copied from non-volatile memory into volatile memory (e.g., dynamic random access memory (DRAM), static random access memory (SRAM)) of network device 700.

Interface 702 may be used in the wired and/or wireless communication of signaling and/or data to or from network device 700. For example, interface 702 may perform any formatting, coding, or translating to allow network device 700 to send and receive data whether over a wired and/or a wireless connection. In some embodiments, interface 702 may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas 708 to the appropriate recipient(s). In some embodiments, interface 702 may comprise network interface controller(s) (NICs), also known as a network interface card, network adapter, local area network (LAN) adapter or physical network interface. The NIC(s) may facilitate in connecting the network device 700 to other devices allowing them to communicate via wire through plugging in a cable to a physical port connected to a NIC. As explained above, in particular embodiments, processor 704 may represent part of interface 702, and some or all of the functionality described as being provided by interface 702 may be provided more specifically by processor 704.

The components of network device 700 are each depicted as separate boxes located within a single larger box for reasons of simplicity in describing certain aspects and features of network device 700 disclosed herein. In practice however, one or more of the components illustrated in the example network device 700 may comprise multiple different physical elements (e.g., interface 702 may comprise terminals for coupling wires for a wired connection and a radio transceiver for a wireless connection).

The solution described herein may thus be implemented in the network device 700 by means of a computer program comprising instructions which, when executed on at least one processor, cause the at least one processor to carry out the actions according to any of the above features and embodiments, where appropriate. While the modules are illustrated as being implemented in software stored in memory 706, other embodiments implement part or all of each of these modules in hardware.

Although FIGS. 5 and 7 depict a single entities 560, 540, 550, 510, 530, 520, 700 it may be the case that either device may be made of up of two or more physically or logically separate components that, taken as a whole, perform the relevant functions or features of the respective device. For example, network device 700 may comprise a base station component deployed at one location and control node component deployed at a second location. The two components together may comprise a single network device 700.

Figure 8:
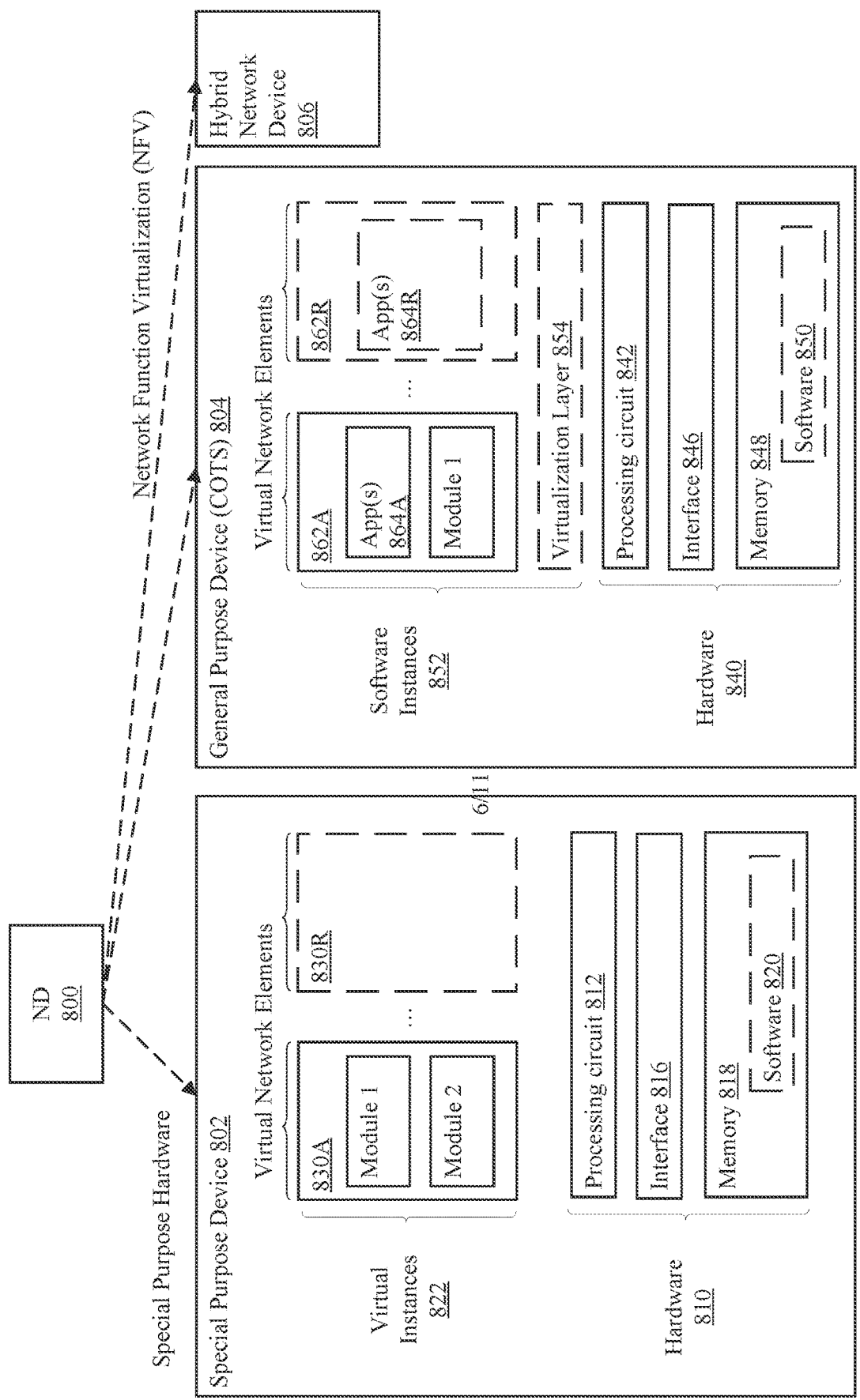
FIG. 8 is a block diagram of example network node implementations.

FIG. 8 illustrates two specific examples of how a network device (ND) 800, such as apparatus 700 like AGO 440, 540 may be implemented in certain embodiments of the described solution including: 1) a special-purpose network device 802 that uses custom processing circuits such as application—specific integrated—circuits (ASICs) and a proprietary operating system (OS); and 2) a general purpose network device 804 that uses common off-the-shelf (COTS) processors and a standard OS which has been configured to provide one or more of the features or functions disclosed herein.

Special-purpose network device 802 includes hardware 810 comprising processor(s) 812, and interface 816, as well as memory 818 having stored therein software 820. In one embodiment, the software 820 implements the modules described with regard to the previous figures. During operation, the software 820 may be executed by the hardware 810 to instantiate a set of one or more software instance(s) 822. Each of the software instance(s) 822, and that part of the hardware 810 that executes that software instance (be it hardware dedicated to that software instance, hardware in which a portion of available physical resources (e.g., a processor core) is used, and/or time slices of hardware temporally shared by that software instance with others of the software instance(s) 822), form a separate virtual network element 830A-R. Thus, in the case where there are multiple virtual network elements 830A-R, each operates as one of the network devices from the preceding figures.

Returning to FIG. 8, the example general purpose network device 804 includes hardware 840 comprising a set of one or more processor(s) 842 (which are often COTS processors) and interface 846, as well as memory 848 having stored therein software 850. During operation, the processor(s) 842 execute the software 850 to instantiate one or more sets of one or more applications 864A-R. While certain embodiments do not implement virtualization, alternative embodiments may use different forms of virtualization. For example, in certain alternative embodiments virtualization layer 854 represents the kernel of an operating system (or a shim executing on a base operating system) that allows for the creation of multiple instances 862A-R called software containers that may each be used to execute one (or more)

of the sets of applications 864A-R. In this embodiment, software containers 862A-R (also called virtualization engines, virtual private servers, or jails) are user spaces (typically a virtual memory space) that may be separate from each other and separate from the kernel space in which the operating system is run. In certain embodiments, the set of applications running in a given user space, unless explicitly allowed, may be prevented from accessing the memory of the other processes. In other such alternative embodiments virtualization layer 854 may represent a hypervisor (sometimes referred to as a virtual machine monitor (VMM)) or a hypervisor executing on top of a host operating system; and each of the sets of applications 864A-R may run on top of a guest operating system within an instance 862A-R called a virtual machine (which in some cases may be considered a tightly isolated form of software container that is run by the hypervisor). In certain embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared by software containers 862A-R), forms a separate virtual network element(s) 860A-R.

The virtual network element(s) 860A-R perform similar functionality to the virtual network element(s) 830A-R. This virtualization of the hardware 840 is sometimes referred to as network function virtualization (NFV)). Thus, NFV may be used to consolidate many network equipment types onto industry standard high volume server hardware, physical switches, and physical storage, which could be located in for example data centers and customer premise equipment (CPE). However, different embodiments of the invention may implement one or more of the software container(s) 862A-R differently. While embodiments of the invention are illustrated with each instance 862A-R corresponding to one VNE 860A-R, alternative embodiments may implement this correspondence at a finer level granularity; it should be understood that the techniques described herein with reference to a correspondence of instances 862A-R to VNEs also apply to embodiments where such a finer level of granularity and/or unikernels are used.

The third exemplary ND implementation in FIG. 8 is a hybrid network device 806, which includes both custom ASICs/proprietary OS and COTS processors/standard OS in a single ND or a single card within an ND. In certain embodiments of such a hybrid network device, a platform virtual machine (VM), such as a VM that that implements the functionality of the special-purpose network device 802, could provide for para-virtualization to the hardware present in the hybrid network device 806.

Figure 9:
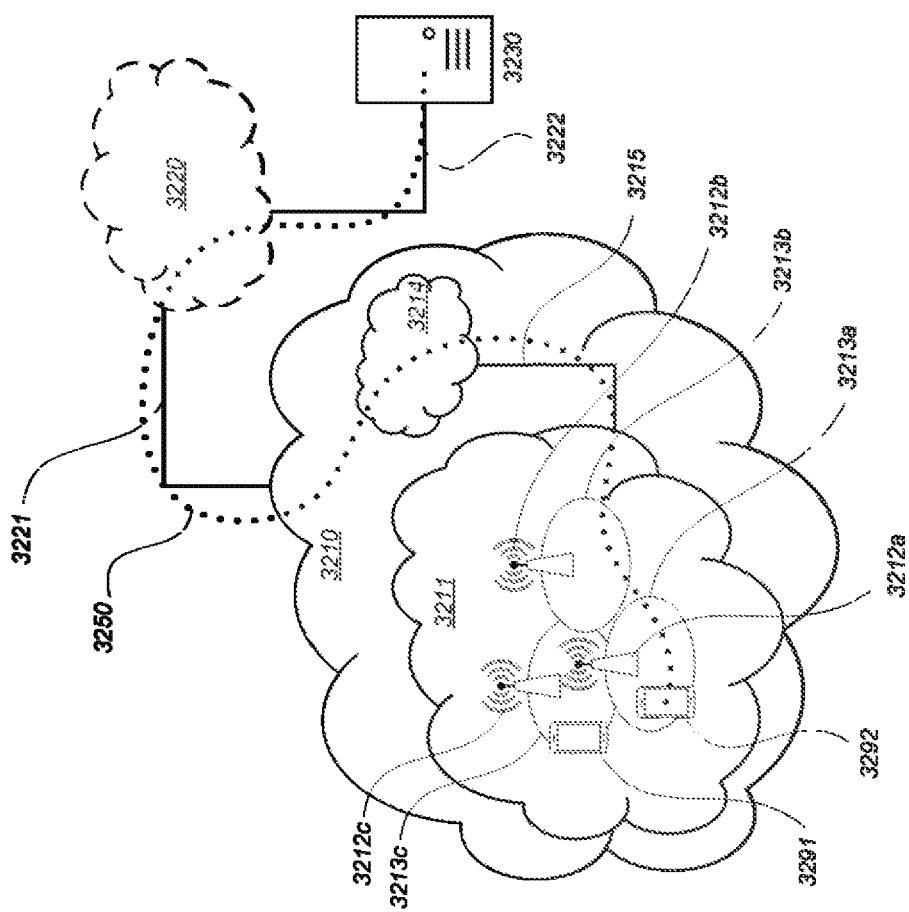
FIG. 9 schematically illustrates a telecommunication network connected via an intermediate network to a host computer.

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 33 may be identical to the host computer 3230, one of the base stations 3212a, 3212b, 3212c and one of the UEs 3291, 3292 of FIG. 32, respectively. This is to say, the inner workings of these entities may be as shown in FIG. 10 and independently, the surrounding network topology may be that of FIG. 9.

Figure 10:
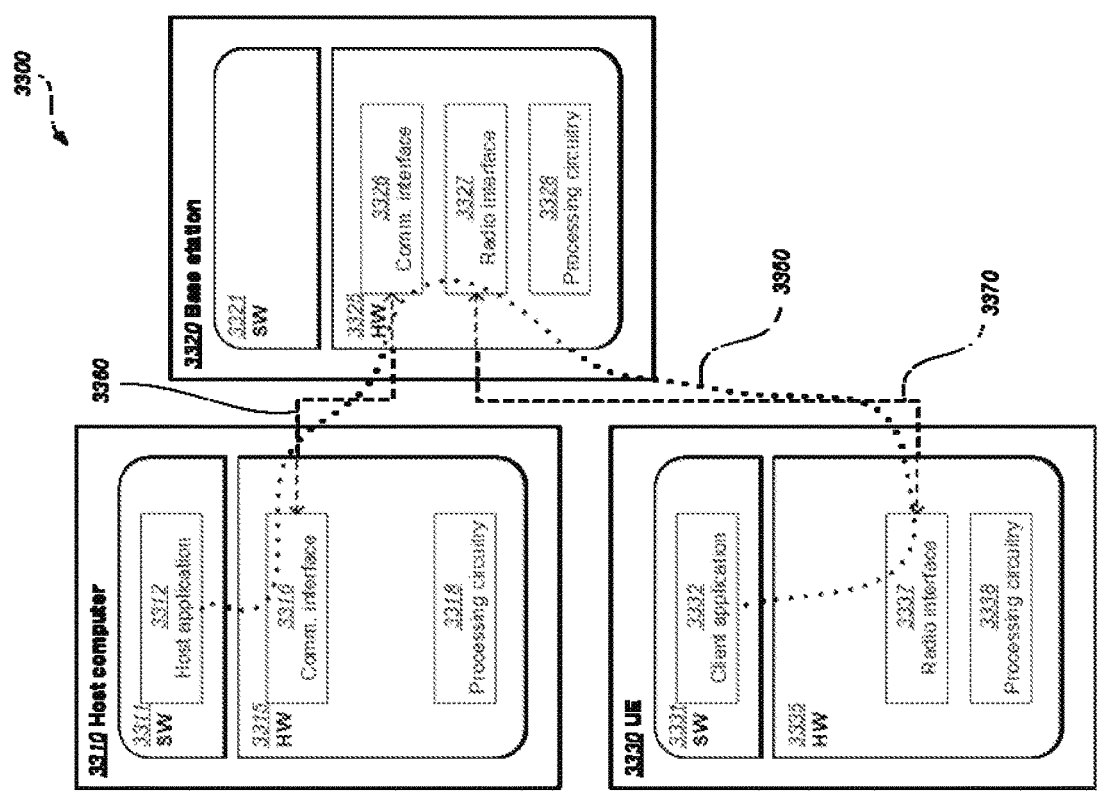
FIG. 10 is a generalized block diagram of a host computer communicating via a base station with a user equipment over a partially wireless connection.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the embodiments where end-user consumes media streams using the user equipment in a wireless network. One or more of the various embodiments improve the performance of OTT services provided to the UE 3330 using the OTT connection 3350, in which the wireless connection 3370 forms the last segment. More precisely, the teachings of these embodiments may improve the data rate and latency, and thereby provide benefits such as reduced user waiting time, better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 11:
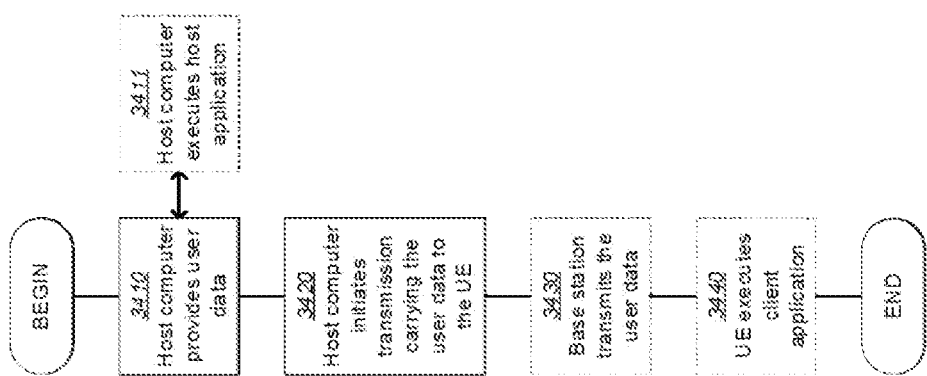
FIGS. 11 to 12 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 34 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 12:
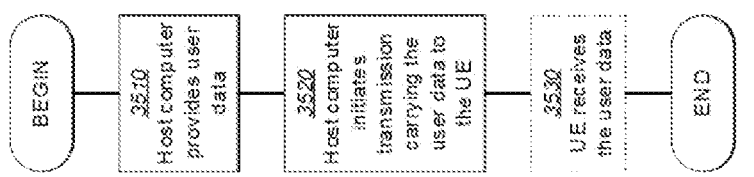

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Group A Embodiments

A1. A method of allocating network resources to a plurality of media flows in a communications network, the method comprising the steps of:
  determining a media content characteristic for the plurality of media flows;
  partitioning the plurality of media flows into one or more media flow groups based on the media content characteristic;
  initiating allocation of a separate network resource pool to the one or more media flow groups to be used by media flows belonging to respective media flow group.

A2. The method of embodiment A1, wherein the plurality of media flows are partitioned into one or more media flow groups such that media flows having similar media content characteristic are partitioned into the same media flow group.

A3. The method of any preceding embodiment, wherein determining the media content characteristic comprises obtaining a quality metric for the plurality of media flows, the quality metric being indicative of user-perceived media quality in relation to media flow bitrate.

A4. The method of embodiment A3, wherein obtaining the quality metric comprises receiving the quality metric from an originator of the respective media flow.

A5. The method of any preceding embodiment, wherein the media content characteristic is determined using a first machine learning function based on network traffic parameters for respective media flow.

A6. The method of any preceding embodiment, wherein the media content characteristic is determined based on domain name system, DNS information associated with the respective media flow.

A7. The method of any preceding embodiment, wherein allocating the separate network resource pool to the one or more media flow groups comprises allocating a wireless network resource pool to the one or more media flow groups.

A8. The method of any preceding embodiment, wherein allocating a separate network resource pool to the one or more media flow groups comprises allocating a wired network resource pool to the one or more media flow groups.

A9. The method of any preceding embodiment, wherein network resources in the allocated network resource pool are divided substantially equally among media flows belonging to respective media flow group when cumulative demand for network resources by the media flows in the respective media flow group exceeds the supply of the network resources in the allocated network resource pool.

A10. The method of any preceding embodiment, further comprising identifying the plurality of media flows from network traffic in the communications network.

A11. The method of embodiment A10, wherein the plurality of media flows are identified by classifying packet flows of the network traffic based on network traffic parameters for packets belonging to respective packet flow.

A12. The method of embodiment A11, wherein the packet flows of the network traffic are classified based on network traffic parameters for packets belonging to respective packet flow using a second machine learning function.

A13. The method of any preceding embodiment, wherein at least one the plurality of media flows is encoded based on a performance metric of a network connection between a client device and originator of the media flow.

A14. The method of any preceding embodiment, wherein at least one of the plurality of media flows comprises adaptive bitrate streaming flow.

A15. The method of any of the embodiments A13 to A14, wherein the plurality of media flows comprise one or more video streaming flows.

A16. The method of any preceding embodiment, wherein the plurality of media flows comprise one or more encrypted media flows.

Group B Embodiments

B1. A base station configured to communicate with a user equipment (UE), the base station comprising a radio interface and processing circuitry configured to perform steps of any of the embodiments A1-A16.

B2. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform steps of the method according to any of the embodiments A1-A16.

B3. The communication system of embodiment B2, further including the base station.

B4. The communication system of embodiment B3, further including the UE, wherein the UE is configured to communicate with the base station.

B5. The communication system of embodiment B4, wherein:
  the processing circuitry of the host computer is configured to execute a host application, thereby providing the user data; and
  the UE comprises processing circuitry configured to execute a client application associated with the host application.

B6. A method implemented in a base station, comprising steps of the method according to any of the embodiments A1-A16.

B7. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the base station is configured to perform any of the steps of the method of embodiments A1-A16.

B8. The method of embodiment B7, further comprising: at the base station, transmitting the user data.

B9. The method of embodiment B8, wherein the user data is provided at the host computer by executing a host application, the method further comprising:
 at the UE, executing a client application associated with the host application.

B10. A user equipment (UE) configured to communicate with a base station, the UE comprising a radio interface and processing circuitry configured to receive one or more of the plurality of media flows from the at least one media flow group using the network resources allocated to the respective media flow group in accordance with any of the steps of the method of embodiments A1-A16.

B11. A communication system including a host computer comprising:
 processing circuitry configured to provide user data; and
 a communication interface configured to forward user data to a cellular network for transmission to a user equipment (UE),
 wherein the UE comprises a radio interface and processing circuitry, the UE's processing circuitry configured to receive one or more of the plurality of media flows from the at least one media flow group using the network resources allocated to the respective media flow group in accordance with any of the steps of the method of embodiments A1-A16.

B12. The communication system of embodiment B11, further including the UE.

B13. The communication system of embodiment B12, wherein the cellular network further includes a base station configured to communicate with the UE.

B14. The communication system of embodiment B12 or B13, wherein:
 the processing circuitry of the host computer is configured to execute a host application, thereby providing the user data; and
 the UE's processing circuitry is configured to execute a client application associated with the host application.

B15. A method implemented in a user equipment (UE), comprising receiving one or more of the plurality of media flows from the at least one media flow group using the network resources allocated to the respective media flow group in accordance with any of the steps of the method of embodiments A1-A16.

B16. A method implemented in a communication system including a host computer, a base station and a user equipment (UE), the method comprising:
 at the host computer, providing user data; and
 at the host computer, initiating a transmission carrying the user data to the UE via a cellular network comprising the base station, wherein the UE is configured to receive one or more of the plurality of media flows from the at least one media flow group using the network resources allocated to the respective media flow group in accordance with any of the steps of the method of embodiments A1-A16.

B17. The method of embodiment B16, further comprising:
 at the UE, receiving the user data from the base station.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of allocating network resources to a plurality of media flows in a communications network, the method comprising the steps of:
 identify the plurality of media flows from network traffic in the communications network by classifying packet flows of the network traffic based on network traffic parameters for packets belonging to respective packet flow using a second machine learning function, and wherein at least one of the plurality of media flows is encoded based on a performance metric of a network connection between a client device and originator of the media flow;
 determining a media content characteristic for the plurality of media flows using a first machine learning function based on network traffic parameters for a respective media flow;
 partitioning the plurality of media flows into one or more media flow groups based on the determined media content characteristic, wherein media flows having similar media content characteristic are partitioned into the same media flow group, and each media flow group comprises a different media content characteristic including high dynamic content or low dynamic content; and
 initiating allocation of a separate network resource pool to the one or more media flow groups to be used by media flows belonging to respective media flow group.

2. The method of claim 1, wherein the method is performed by a network node in the communication network.

3. An apparatus for allocating network resources to a plurality of media flows in a communications network, the apparatus comprising processing circuitry and a memory containing instructions executable by the processing circuitry, whereby the apparatus is operable to:
 determine a media content characteristic for the plurality of media flows, wherein determining the media content characteristic comprises obtaining a quality metric for the plurality of media flows indicative of user-perceived media quality in relation to media flow bitrate, determine the media content characteristic based on domain name system, DNS information associated with the respective media flow;
 partition the plurality of media flows into one or more media flow groups based on the determined media content characteristic, wherein media flows having similar media content characteristic are partitioned into the same media flow group, and each media flow group comprises a different media content characteristic including high dynamic content or low dynamic content; and initiate allocation of a separate network resource pool to the one or more media flow groups to be used by media flows belonging to respective media flow group.

4. The apparatus of claim 3, operable to obtain the quality metric by receiving the quality metric from an originator of the respective media flow.

5. The apparatus of claim 3, operable to determine the media content characteristic using a first machine learning function based on network traffic parameters for respective media flow.

6. The apparatus of claim 3, operable to allocate the separate network resource pool to the one or more media flow groups by allocating a wireless network resource pool to the one or more media flow groups.

7. The apparatus of claim 3, operable to allocate a separate network resource pool to the one or more media flow groups by allocating a wired network resource pool to the one or more media flow groups.

8. The apparatus of claim 3, wherein network resources in the allocated network resource pool are divided substantially equally among media flows belonging to respective media flow group when cumulative demand for network resources by the media flows in the respective media flow group exceeds a supply of the network resources in the allocated network resource pool.

9. The apparatus of claim 3, further operable to identify the plurality of media flows from network traffic in the communications network.

10. The apparatus of claim 9, operable to identify the plurality of media flows by classifying packet flows of the network traffic based on network traffic parameters for packets belonging to respective packet flow.

11. The apparatus of claim 10, operable to classify the packet flows of the network traffic based on network traffic parameters for packets belonging to respective packet flow using a second machine learning function.

12. The apparatus of claim 3, wherein at least one of the plurality of media flows is encoded based on a performance metric of a network connection between a client device and originator of the media flow.

13. The apparatus of claim 3, wherein at least one of the plurality of media flows comprises adaptive bitrate streaming flow.

14. The apparatus of claim 3, wherein the plurality of media flows comprise one or more video streaming flows.

15. The apparatus of claim 3, wherein the plurality of media flows comprise one or more encrypted media flows.

16. A non-transitory computer program product comprising a computer readable medium, the computer readable medium having computer readable code embodied therein, the computer readable code being configured such that, on execution by a suitable computer or processor, the computer or processor is caused to:

determine a media content characteristic for the plurality of media flows, wherein determining the media content characteristic comprises obtaining a quality metric for the plurality of media flows indicative of user-perceived media quality in relation to media flow bitrate;

partition the plurality of media flows into one or more media flow groups based on the determined media content characteristic, wherein media flows having similar media content characteristic are partitioned into the same media flow group, and each media flow group comprises a different media content characteristic including high dynamic content or low dynamic content; and initiate allocation of a separate network resource pool to the one or more media flow groups to be used by media flows belonging to respective media flow group, wherein network resources in the allocated network resource pool are divided substantially equally among media flows belonging to respective media flow group when cumulative demand for network resources by the media flows in the respective media flow group exceeds a supply of the network resources in the allocated network resource pool.

17. The method of claim 1, wherein determining the media content characteristic comprises obtaining a quality metric for the plurality of media flows indicative of user-perceived media quality in relation to media flow bitrate, wherein obtaining the quality metric comprises receiving the quality metric from an originator of the respective media flow.

18. The method of claim 1, wherein determining the media content characteristic comprises using a first machine learning function based on network traffic parameters for respective media flow.

19. The method of claim 1, wherein network resources in the allocated network resource pool are divided substantially equally among media flows belonging to respective media flow group when cumulative demand for network resources by the media flows in the respective media flow group exceeds a supply of the network resources in the allocated network resource pool.

20. The non-transitory computer program product of claim 16, wherein obtaining the quality metric comprises receiving the quality metric from an originator of the respective media flow.

* * * * *